United States Patent
Fukushima et al.

(10) Patent No.: US 6,208,595 B1
(45) Date of Patent: Mar. 27, 2001

(54) MAGNETO-OPTICAL RECORDING MEDIUM

(75) Inventors: Yoshihito Fukushima; Atsushi Takeuchi; Hiroyuki Takemoto, all of Miyagi; Kenichi Itoh, Kanagawa; Mineo Moribe, Kanagawa; Takehiko Numata, Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/359,869

(22) Filed: Jul. 26, 1999

(30) Foreign Application Priority Data

Aug. 7, 1998 (JP) .................................. 10-224745

(51) Int. Cl.⁷ .................................................. G11B 11/00
(52) U.S. Cl. ............................................................ 369/13
(58) Field of Search ................................. 369/13, 14, 110, 369/116, 112; 300/59, 114; 428/694 ML

(56) References Cited

U.S. PATENT DOCUMENTS

| | | | |
|---|---|---|---|
| 4,466,035 | * 8/1984 | Connell et al. | 360/114 |
| 4,953,124 | * 8/1990 | Koyama | 369/13 |
| 5,031,993 | * 7/1991 | Asthana et al. | 385/37 |
| 5,394,381 | * 2/1995 | Fukumoto et al. | 369/13 |
| 5,850,375 | * 12/1998 | Wilde et al. | 369/14 |
| 5,850,383 | * 12/1998 | Kawano | 369/275.4 |
| 5,870,353 | * 2/1999 | Morimoto et al. | 369/13 |
| 5,920,538 | * 7/1999 | Il'Yashenko | 369/112 |
| 6,002,653 | * 12/1999 | Fukumoto | 369/13 |

\* cited by examiner

*Primary Examiner*—Tan Dinh
(74) *Attorney, Agent, or Firm*—Limbach & Limbach L.L.P.

(57) ABSTRACT

On the assumption that a phase difference caused by a birefringence at the substrate is $\phi_{br}$ while a one caused by the magneto-optic Kerr effect of the recording layer is $\phi_{MO}$, the magneto-optical recording medium formatted to record information in the groove meets the conditions: $-20°<\phi_{br}<+10°$ and $-45°<(\phi_{br}+\phi_{MO})<+15°$, the magneto-optical recording medium formatted to record information on the land meets the conditions: $-20°<\phi_{br}<+10°$ and $-15°<(\phi_{br}+\phi_{MO})<+45°$, and the magneto-optical recording medium formatted to record information at both the land and groove meets the conditions: $-20°<\phi_{br}<+10°$ and $-15°<(\phi_{br}+\phi_{MO})<+15°$.

6 Claims, 13 Drawing Sheets

MAGNETO-OPTICAL RECORDING MEDIUM

BACKGROUND OF THE INVENTION

1. Field of the Invention

The present invention relates to a magneto-optical recording medium having a recording layer formed on a substrate thereof on which grooves and embossed pits are formed.

2. Description of Related Art

As one of magneto-optical recording media, a magneto-optical disc is schematically illustrated in FIG. 1. As shown, the magneto-optical disc has a recording track or tracks formed spirally or concentrically thereon. Such a magneto-optical disc has on a substrate thereof a recording layer of which the Kerr effect is used to write and/or read information signal to/from the magneto-optical disc.

It should be noted that in the plane of the recording layer of the magneto-optical recording medium, a direction perpendicular to the recording track will be referred to herein as "x-direction" while a direction tangential to the recording track will be referred to as "y-direction". Therefore, in the magneto-optical disc shown in FIG. 1, the radial direction of the magneto-optical disc is the x-direction while the tangential direction of the recording track is the y-direction.

To read information signal from the magneto-optical disc, a linearly polarized laser light is irradiated from a laser source 100 having a semiconductor laser or the like, and it is focused on the recording layer of a magneto-optical disc 102 by an objective lens 101 as shown in FIG. 2. A return light from the recording layer is taken out through a first polarizing beam splitter 103, and passed through a phase compensator plate 104 and ½-wavelength plate 105. It is thus incident upon a second polarizing beam splitter 106. A laser light transmitted through the second polarizing beam splitter 106 is detected by a first photodiode 107, while a light reflected by the second polarizing beam splitter 106 is detected by a second photodiode 108.

The return light from the magneto-optical disc 102 has a plane of polarization thereof rotated due to the Kerr effect correspondingly to the information signal recorded at the recording layer. As the plane of polarization of the return light is rotated, the output from the first photodiode 107 which detects a polarized component of the return light having been transmitted through the first polarizing beam splitter 106 is increased or decreased depending upon the rotating direction of the return light plate of polarization as shown in FIG. 3A. Similarly, the output from the second photodiode 108 which detects a polarized component of the return light having been reflected by the second polarizing beam splitter 106 is increased or decreased depending upon the rotating direction of the return light plane of rotation as shown in FIG. 3B.

When the output from the first photodiode 107 is increased, the output from the second photodiode 108 is decreased. Reversely, when the output from the first photodiode 107 is decreased, the output from the second photodiode 108 is increased. Therefore, as shown in FIG. 3C, a differential is determined between the output from the first photodiode 107 and that from the second photodiode 108 to detect the rotated status of the plane of polarization of the return light, thereby detecting an information signal. That is, an information signal recorded at the recording layer of the magneto-optical disc 102 is detected and reproduced as a signal of a differential between the output from the first photodiode 107 and that from the second photodiode 108. The differential signal will be referred to as "MO signal" hereinunder.

Recently, magneto-optical discs adopting a recording format called "ZCAV (zone constant angular velocity) format" have been developed to attain a further higher recording density.

The ZCAV format is such that to eliminate a difference in linear density between lead-in and lead-out areas, the recording area of a magneto-optical disc is divided into a plurality of concentric bands 110a, 110b, 110c and 110d, as shown in FIG. 4, in each of which a fixed frequency is used for write and/or read of information signal. That is, in a ZCAV-formatted magneto-optical disc, areas where a basic frequency is used to record information signal are grouped as one band and thus the whole surface of the magneto-optical disc is divided into some bands different in recording frequency from one another.

In the ZCAV format, each of the bands is divided into sectors 111 disposed to have the same angle so that a fixed frequency can be used for read and/or write of information signal from/to the sectors 111 in the same band. Therefore, the sectors 111 are disposed in a circumferential series in the same band, but sectors in one band are displaced from those in the other band adjacent to the one band. That is, the ZCAV format provides sectors 111 formed in one band and circumferentially displaced from those formed in a band adjacent to the one band.

Usually, in a magneto-optical disc, the sector 111 has an embossed pit area 112, in the leading portion thereof, where there are pre-formed embossed pits of which the convex-concave pattern indicates information such as address, and a magneto-optical recording area 113, in the other portion thereof, where no embossed pits are formed and data is written by magneto-optical recording.

From the embossed pit area 112, a signal indicative of a change in reflected quantity of light is read, and a signal is read by the Kerr effect from the magneto-optical recording area 113 where data is written by the magneto-optical recording.

In the ZCAV format, the sectors 111 formed in one band are circumferentially displaced from those in a adjacent band. Thus, at the boundary between the bands, the embossed pit area 112 disposed in the leading portion of the sector 111 will be adjacent to the magneto-optical recording area 113 in the adjacent track as shown in FIG. 5 being a view, enlarged in scale, of the portion A in FIG. 4.

Usually, as a substrate of magneto-optical disc, a disc-like substrate formed by injection molding of a polymeric material such as polycarbonate is used because it will contribute very much to a reduced cost in mass production of the magneto-optical disc. Generally, the substrate formed from such a polymeric material has such a photoelasticity that a ZCAV-formatted magneto-optical disc is disadvantageous as in the following:

In the ZCAV-formatted magneto-optical disc, the embossed pit area 112 and magneto-optical recording area 113 are adjacent to each other at a boundary as shown in FIG. 5. When the embossed pit area 112 adjoins the magneto-optical recording area 113, stresses B developed around embossed pits 114 will cause a local change of the optical characteristic of the magneto-optical. In a substrate having a large coefficient of photoelasticity like the polycarbonate substrate widely used as the substrate of magneto-optical disc, the stresses around the embossed pits 114 will cause a local change of the optical characteristic of the magneto-optical disc.

Such a local change of the optical characteristic will cause a distortion of MO signal. That is to say, since the optical characteristic is locally changed at the boundary between the bands in the ZCAV formatted magneto-optical disc, the signal distortion at the band boundary will be a cross-talk which will deteriorate the quality of MO signal.

Such a cross-talk will take place not only at one adjacent directly to the embossed pit area 112, of the recording tracks in the magneto-optical recording area 113, but at a recording track not adjacent directly to the embossed pit area 112 within a range affectable by the local change of optical characteristic. Thus, even at a recording track 10 tracks apart from the embossed pit area 112, the cross-talk will take place as the case may be.

The magnitude of the cross-talk caused by the aforementioned local change of optical characteristic of the substrate depends upon a phase difference caused by an optical system of a magneto-optical disc drive, macroscopic birefringence at a disc substrate, etc. The intensity of MO signal depends upon a phase difference caused due to the magneto-optic Kerr effect of the recording layer, for example, in addition to the above-mentioned phase difference and birefringence. In a magneto-optical disc having grooves and lands formed along the recording tracks, the intensity of MO signal depends upon a phase difference caused by the effect of diffraction at the groove and land.

As in the above, the magnitude of a cross-talk in the MO signal depends upon various factors. Therefore, the magneto-optical disc should be considered from various aspects to suppress a cross-talk caused by the aforementioned local change of optical characteristic of the substrate in the ZCAV-formatted magneto-optical disc and assure a sufficiently high output of reproduction from the disc.

SUMMARY OF THE INVENTION

Accordingly, the present invention has an object to overcome the above-mentioned drawbacks of the prior art by providing a magneto-optical recording medium incurring less cross-talk caused by a local change of optical characteristic at a portion where an embossed pit area where embossed pits indicating information by their convex-concave pattern are pre-formed and a magneto-optical area where no embossed pits are formed, and capable of a sufficiently high output of reproduction.

To attain the above object, the Inventor has made further studies and found that the cross-talk caused by the local change of optical characteristic of the substrate can be suppressed and a sufficiently large output of reproduction can be assured, by limiting to a certain range the magnitude of a phase difference caused by a birefringence at the substrate and that of a phase difference caused by the magneto-optic Kerr effect of the recording layer.

The above object can be attained by providing a magneto-optical recording medium comprising a substrate having grooves and lands formed along recording tracks and also formed thereon embossed pits indicating information by their convex-concave pattern and which is formatted to record a magneto-optical signal in the groove. On the assumption that a direction in the plane of a recording layer and perpendicular to the recording track is an x-direction while a direction in the plane of the recording layer and along the recording track is a y-direction and that of phase differences between an x-directional polarized component and a y-directional polarized component of a return part of a reading light reflected back from the recording layer, a one caused by a birefringence at the substrate is $\phi_{br}$ while a one caused by the magneto-optic Kerr effect of the recording layer is $\phi_{MO}$, the magneto-optical recording medium meets the following conditions (1-1) and (1-2):

$$-20°<\phi_{br}<+10° \quad (1\text{-}1)$$

$$-45°<(\phi_{br}+\phi_{MO})<+15° \quad (1\text{-}2)$$

Since the magneto-optical recording medium meets the condition: $-20°<\phi_{br}<+10°$, the cross-talk caused by a local change of the optical characteristic is much suppressed as will further be described. In addition since the condition: $-45°<(\phi_{br}+\phi_{MO})<+15°$ is also met, a sufficiently large output of reproduction can be provided when a signal recorded by the groove-recording format is reproduced, as will also be described later.

Also the above object can be attained by a magneto-optical recording medium comprising a substrate having grooves and lands formed along recording tracks and also formed thereon embossed pits indicating information by their convex-concave pattern and which is formatted to record a magneto-optical signal on the land. On the assumption that a direction in the plane of a recording layer and perpendicular to the recording track is an x-direction while a direction in the plane of the recording layer and along the recording track is a y-direction and that of phase differences between an x-directional polarized component and a y-directional polarized component of a return part of a reading light reflected back from the recording layer, a one caused by a birefringence at the substrate is $\phi_{br}$ while a one caused by the magneto-optic Kerr effect of the recording layer is $\phi_{MO}$, the magneto-optical recording medium meets the following conditions (1-3) and (1-4):

$$-20°<\phi_{br}<+10° \quad (1\text{-}1)$$

$$-15°<(\phi_{br}+\phi_{MO})<+45° \quad (1\text{-}3)$$

Since the magneto-optical recording medium meets the condition: $-20°<\phi_{br}<+10°$, the cross-talk caused by a local change of the optical characteristic is much suppressed as will further be described. In addition since the condition: $-15°<(\phi_{br}+\phi_{MO})<+45°$ is also met, a sufficiently large output of reproduction can be provided when a signal recorded in the land-recording format is reproduced, as will also be described later.

Further the above object can be attained by a magneto-optical recording medium comprising a substrate having grooves and lands formed along recording tracks and also formed thereon embossed pits indicating information by their convex-concave pattern and which is formatted to record a magneto-optical signal on both the land and groove. On the assumption that a direction in the plane of a recording layer and perpendicular to the recording track is an x-direction while a direction in the plane of the recording layer and along the recording track is a y-direction and that of phase differences between an x-directional polarized component and a y-directional polarized component of a return part of a reading light reflected back from the recording layer, a one caused by a birefringence at the substrate is $\phi_{br}$ while a one caused by the magneto-optic Kerr effect of the recording layer is $\phi_{MO}$, the magneto-optical recording medium meets the following conditions (1-1) and (1-4):

$$-20°<\phi_{br}<+10° \quad (1\text{-}1)$$

$$-15°<(\phi_{br}+\phi_{MO})<+15° \quad (1\text{-}4)$$

Since the magneto-optical recording medium meets the condition: $-20°<\phi_{br}<+10°$, the cross-talk caused by a local change of the optical characteristic is much suppressed as will further be described. In addition since the condition: $-15°<(\phi_{br}+\phi_{MO})<+15°$ is also met, a sufficiently large output of reproduction can be provided when a signal recorded in the on-land/in-groove recording format is reproduced, as will also be described later.

These objects and other objects, features and advantages of the present intention will become more apparent from the following detailed description of the preferred embodiments of the present invention when taken in conjunction with the accompanying drawings.

DETAILED DESCRIPTION OF THE PREFERRED EMBODIMENTS

Figure 1:
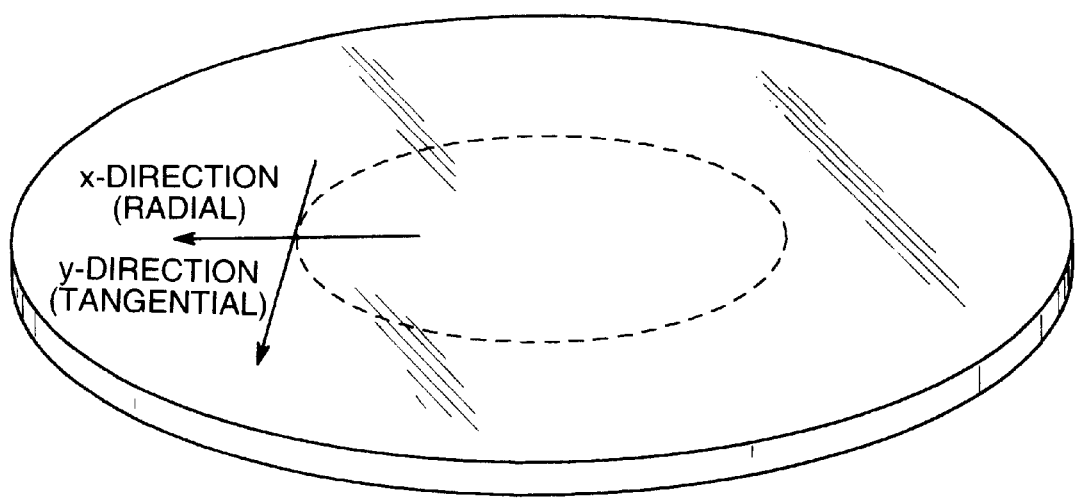
FIG. 1 is a perspective view of a magneto-optical disc.
Figure 2:
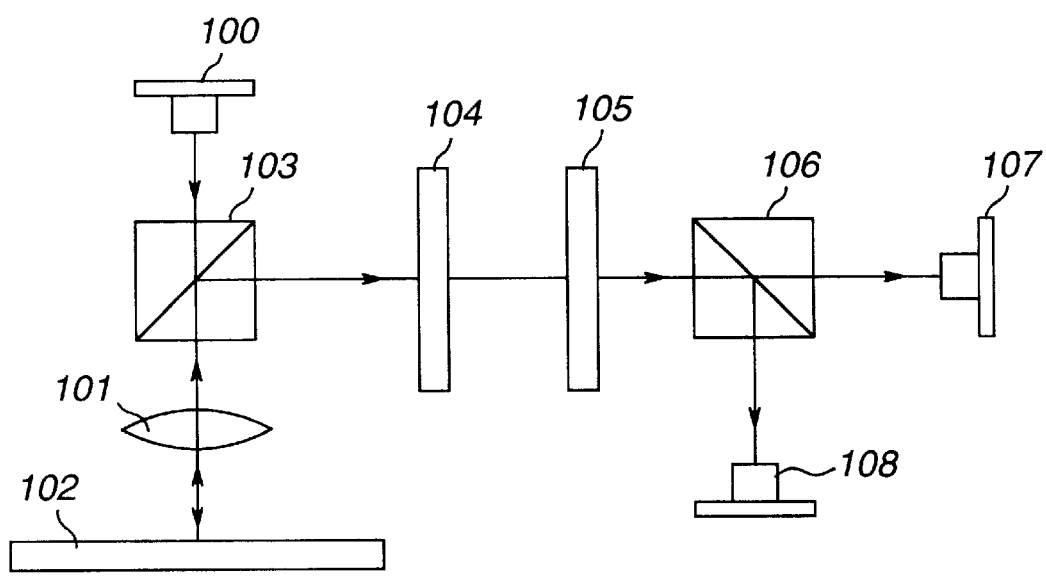
FIG. 2 is a block diagram of a magneto-optical disc drive.
Figure 3:
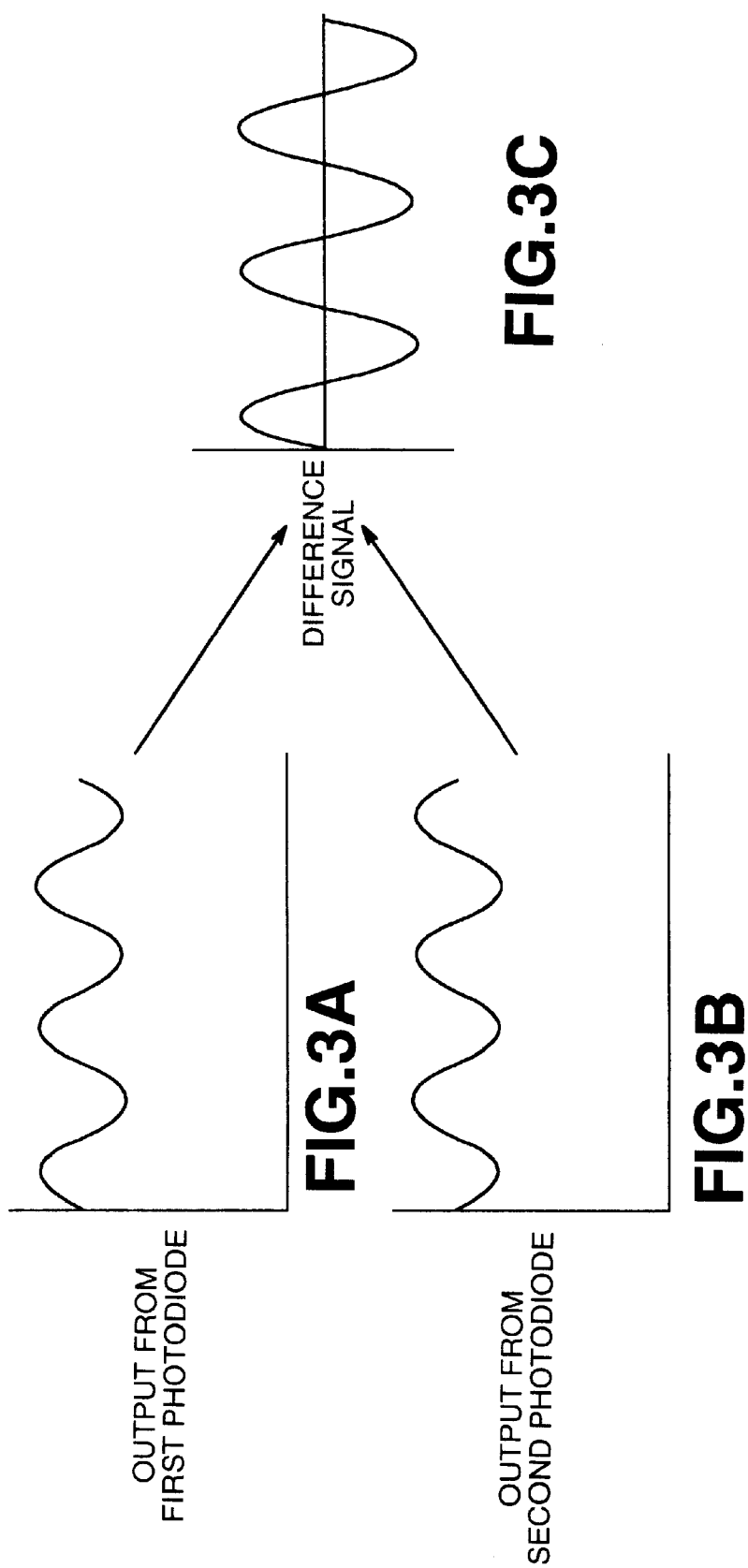
FIGS. 3A, 3B and 3C show the principle of MO signal detection.
Figure 4:
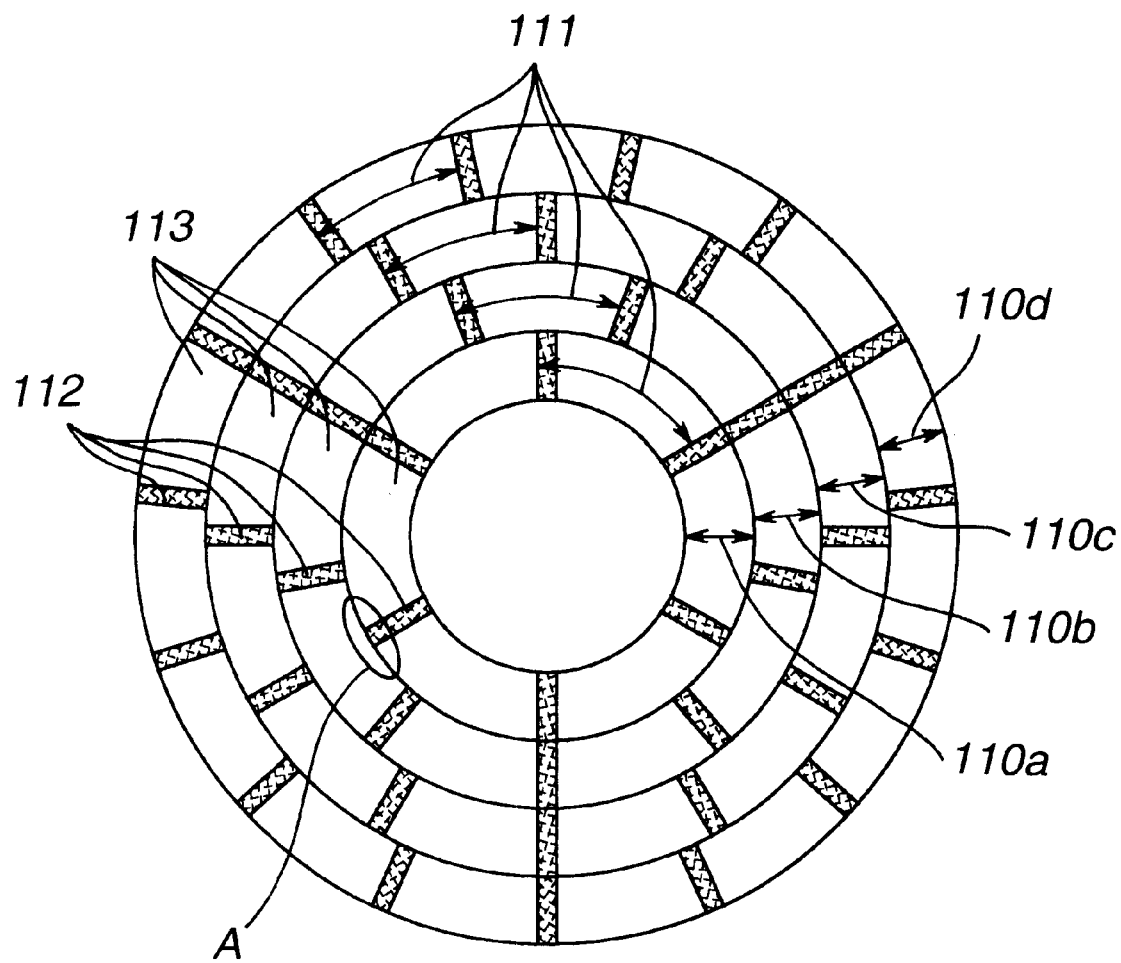
FIG. 4 is a plan view of an example of ZCAV-formatted magneto-optical disc.
Figure 5:
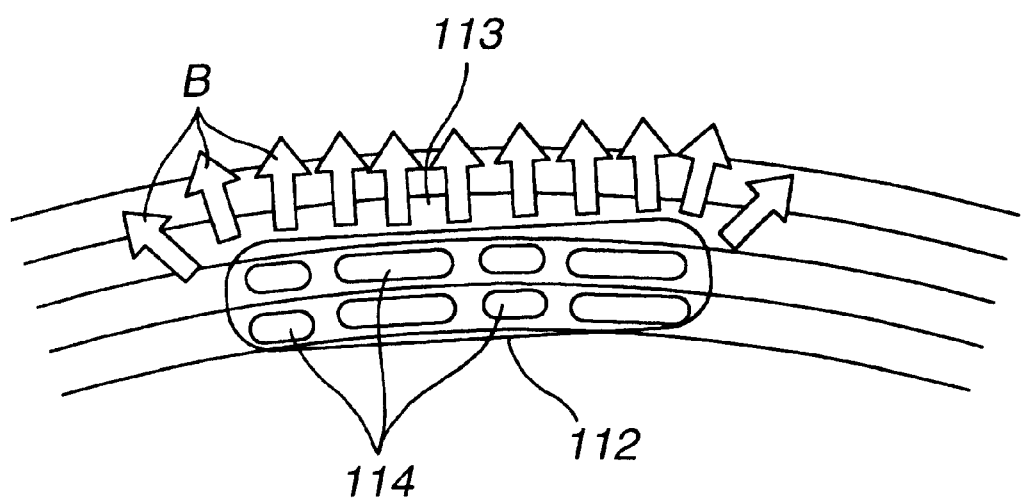
FIG. 5 is an enlarged view of a portion A in FIG. 4.

On the assumption that the radial direction of the magneto-optical disc is x-direction while the direction tangential to the recording track is y-direction, if there is no phase difference between the x-directional polarized component and y-directional polarized component of a return light from the magneto-optical disc, the return light will be linearly polarized while the MO signal will have a maximum amplitude. If a phase difference takes place between the x-directional polarized component and y-directional polarized component of a return light from the magneto-optical disc, the return light will be elliptically polarized while the MO signal will have a reduced amplitude.

The phase difference includes a one caused by a birefringence at the substrate of magneto-optical disc, a one caused by the magneto-optic Kerr effect of the recording layer of the magneto-optical disc, a one caused by diffraction at groove and land on the magneto-optical disc substrate, and a one caused by the optical system of the magneto-optical disc drive. In the following description, the phase difference caused by the birefringence at the disc substrate is referred to as $\phi_{br}$, a one caused by the magneto-optic Kerr effect is as $\phi_{MO}$, a one caused by diffraction at the groove and land on the disc substrate is as $\phi_{diff}$, and a one caused by the optical system of the disc drive is as $\phi_{opt}$. The total of these phase differences is referred to as $\phi_{total}$. Namely, $\phi_{total}=\phi_{br}+\phi_{MO}+\phi_{diff}+\phi_{opt}$.

The phase difference $\phi_{br}$ caused by the birefringence at the disc substrate is expressed with the relation (2-1):

$$\phi_{br}=(N_y-N_x)\times d\times 360/\lambda_0 \qquad (2\text{-}1)$$

where $N_x$ is a refractive index in the x-direction of the disc substrate, $N_y$ is a refractive index in the y-direction of the disc substrate, $\lambda_0$ is a wavelength of incident light in vacuum, and d is a disc substrate thickness.

The phase difference $\phi_{MO}$ caused by the magneto-optic Kerr effect is expressed with the relation (2-2):

$$\phi_{MO}=\tan^{-1}(\epsilon_k/\theta_k) \qquad (2\text{-}2)$$

where $\epsilon_k$ is an elliptical polarization due to the magneto-optical Kerr effect of the recording layer and $\theta_k$ is a Kerr rotation angle. Note that the values $\epsilon_k$ and $\epsilon_k$ are measured on a disc substrate where no grooves and lands are yet formed.

Also note that the phase difference $\phi_{diff}$ caused by the diffraction at the groove and land depends upon the groove depth as will be described later.

The phase difference $\phi_{opt}$ caused by the optical system of the disc drive is usually defined to be within a range of ±15°. In other words, the magneto-optical disc is required to provide a sufficient MO signal even if the phase difference $\phi_{opt}$ varies by ±15°.

On the other hand, the amplitude of the MO signal is generally proportional to cos ($\phi_{total}$) and takes a maximum value when $\phi_{total}$=0°. Normally, the magneto-optical disc and disc drive are required to be adapted such that the amplitude deterioration of the MO signal due to the influence of the phase difference is suppressed to less than 3 dB or so with reference to the maximum amplitude of MO signal. Therefore, the magneto-optical disc and drive are required to meet the following conditions (2-3) and (2-4):

$$20\times\log (\cos (\phi_{total}))>-3 \qquad (2\text{-}3)$$

$$-90°<\phi_{total}<90° \qquad (2\text{-}4)$$

The relations (2-3) and (2-4) show that the magneto-optical disc and disc drive have to meet the condition: $-45°<\phi_{total}<+45°$. As mentioned above, the phase difference $\phi_{opt}$ caused by the optical system of the disc drive is usually defined to be within a range of ±15°. Therefore, to suppress to less than 3 dB the deterioration in amplitude of MO signal due to the influence of the phase difference, the total of phase differences: $\phi_{br}+\phi_{MO}+\phi_{diff}$ caused by the magneto-optical disc has to be suppressed to within a range of ±30°.

In a magneto-optical disc in which an embossed pit area where embossed pits indicating information by a convex-concave pattern are pre-formed and a magneto-optical recording area where no embossed pits are formed, are adjacent to each other, such as a ZCAV-formatted magneto-optical disc, a stress developed by the embossed pits in the embossed pit area will cause the optical characteristic to locally change, which will further cause the MO signal from the magneto-optical recording area to be distorted.

Figure 6:
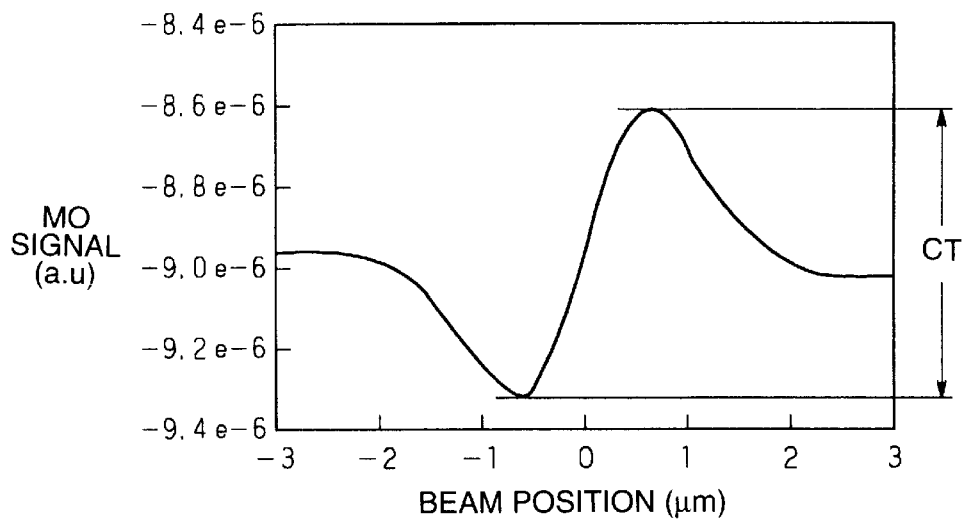
FIG. 6 graphically illustrates an MO signal when laser beam passes by an embossed pit.

FIG. 6 shows an example of MO signal detected from a magneto-optical recording area adjacent to an embossed pit area where embossed pits each having a semicircular shape of 1 μm in diameter are formed. The MO signal is detected when a laser beam passes by an embossed pit. In FIG. 6, the horizontal axis indicates a beam position in a direction, tangential to the recording direction, of an incident laser beam irradiated to detect an MO signal (namely, y-direction) with reference to a position of the adjacent embossed pits.

The MO signal should have an output level which is constant unless it is distorted. However, the MO signal detected by the read laser beam passing by the embossed pit will incur a local distortion as shown in FIG. 6. Note that in the following description, the local distortion of MO signal shown in FIG. 6 is a magnitude of cross-talk (will be referred to as "CT" hereinbelow) affected by a local change of the optical characteristic.

The output level and cross-talk of MO signal greatly depends upon the phase differences $\phi_{br}$, $\phi_{MO}$, $\phi_{diff}$ and $\phi_{opt}$. The relation between the MO signal output level and cross-talk, and phase differences $\phi_{br}$, $\phi_{MO}$, $\phi_{diff}$ and $\phi_{opt}$ will be described based on the results of calculation by a computer and results of tests on the prototypes of magneto-optical discs.

Figure 7:
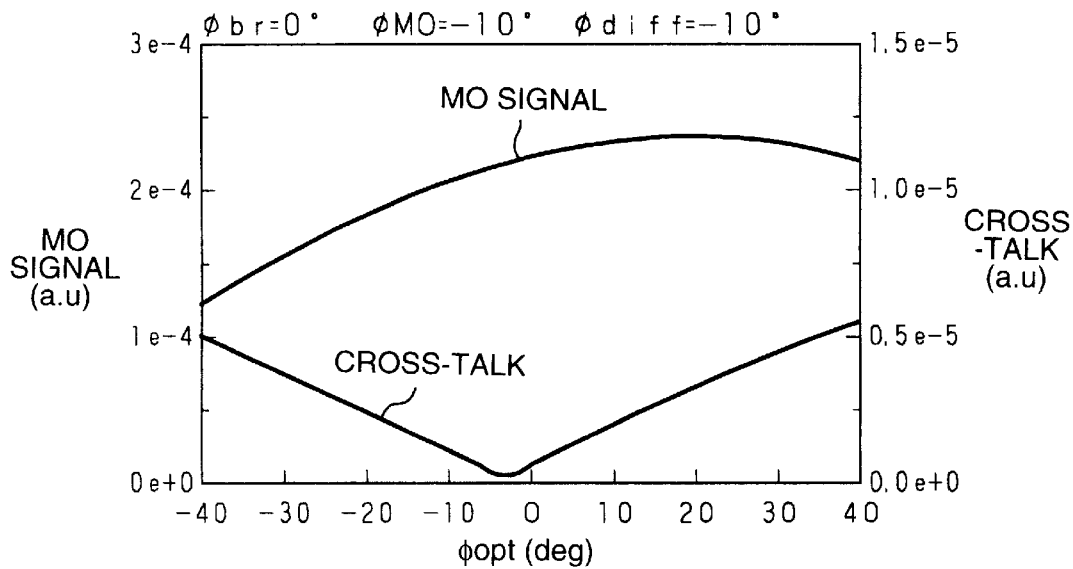
FIG. 7 graphically illustrates a relation between a phase difference $\phi_{opt}$ and MO signal and a relation between $\phi_{opt}$ and cross-talk, when phase differences $\phi_{br}$, $\phi_{MO}$ and $\phi_{diff}$ are 0°, -10° and -10°, respectively.

FIG. 7 shows a relation between a phase difference $\phi_{opt}$ and MO signal and a relation between $\phi_{opt}$ and cross-talk, when phase differences $\phi_{br}$, $\phi_{MO}$ and $\phi_{diff}$ are 0°, −10° and −10°, respectively. The amplitude of the MO signal is at the maximum when $\phi_{opt}+20°$ because $\phi_{total}=0°$ when $\phi_{br}+\phi_{MO}+\phi_{diff}=-20°$ and $\phi_{opt}=+20°$. At this time, the cross-talk is at the minimum when $\phi_{opt}$ is approximately 0°.

Figure 8:
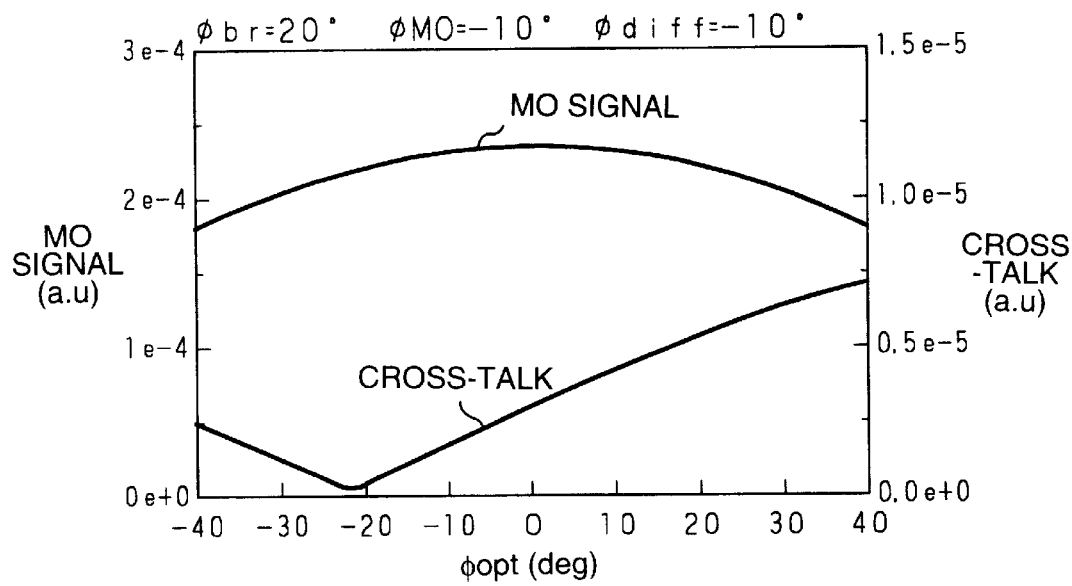
FIG. 8 graphically illustrates a relation between $\phi_{opt}$ and MO signal and a relation between $\phi_{opt}$ and cross-talk, when $\phi_{br}$=20°, $\phi_{MO}$=-10° and $\phi_{diff}$=-10°.

FIG. 8 shows a relation between $\phi_{opt}$ and MO signal and a relation between $\phi_{opt}$ and cross-talk, when $\phi_{br}=+20°$, $\phi_{MO}=-10°$ and $\phi_{diff}=-10°$. The amplitude of the MO signal is at the maximum when $\phi_{opt}=0°$ because $\phi_{total}=0°$ when $\phi_{br}+\phi_{MO}+\phi_{diff}=0°$ and $\phi_{opt}=0°$. At this time, the cross-talk is at the minimum when $\phi_{opt}$ is approximately −20°.

The value $\phi_{opt}$ for the maximum MO signal amplitude is very important. If the value $\phi_{opt}$ is largely deviated from 0°, the MO signal will have a small amplitude within a range of ±15° of the phase difference $\phi_{opt}$ caused by the optical system of the disc drive. Similarly, the value $\phi_{opt}$ for the minimum cross-talk is very important. If the value $\phi_{opt}$ is largely deviated from 0°, the cross-talk will be large when the phase difference $\phi_{opt}$ caused by the optical system of the disc drive is within a range of ±15°.

As seen from FIGS. 7 and 8, the phase difference $\phi_{br}$ affects both the value $\phi_{opt}$ for the maximum MO signal amplitude and value $\phi_{opt}$ for the minimum cross-talk.

Figure 9:
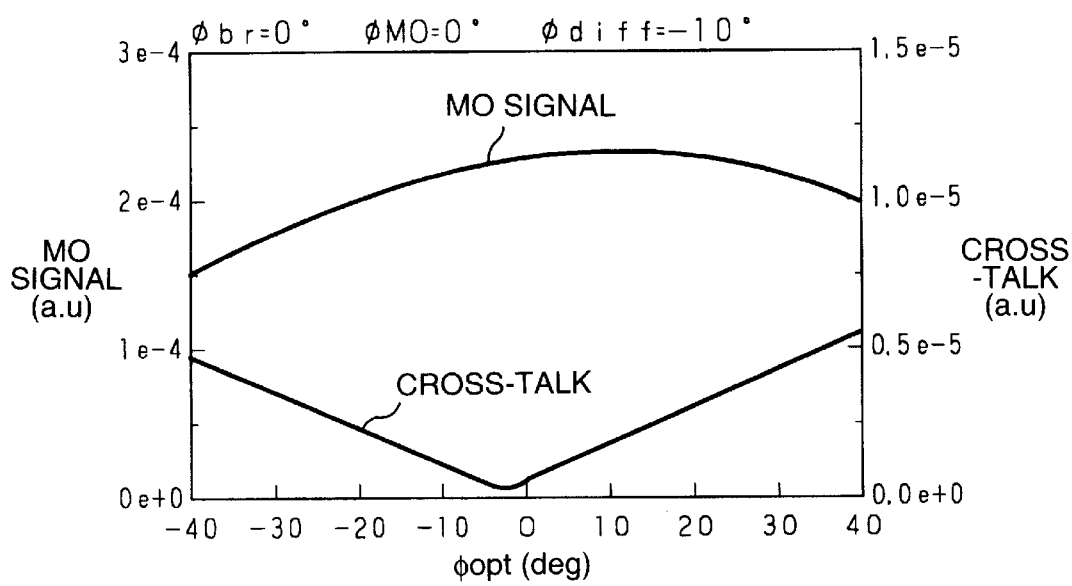
FIG. 9 graphically illustrates a relation between $\phi_{opt}$ and MO signal and a relation between $\phi_{opt}$ and cross-talk, when $\phi_{br}$=0°, $\phi_{MO}$=0° and $\phi_{diff}$=-10°.

FIG. 9 shows a relation between $\phi_{opt}$ and MO signal and a relation between $\phi_{opt}$ and cross-talk, when $\phi_{br}=0°$, $\phi_{MO}=0°$ and $\phi_{diff}=-10°$. The amplitude of the MO signal is at the maximum when $\phi_{opt}=+10°$ because $\phi_{total}=0°$ when $\phi_{br}+\phi_{MO}+\phi_{diff}=-10°$ and $\phi_{opt}=+10°$. At this time, the cross-talk is at the minimum when $\phi_{opt}$ is approximately 0°.

As seen from FIGS. 7 and 9, the phase difference $\phi_{MO}$ affects the value $\phi_{opt}$ for the maximum MO signal amplitude, but not the value $\phi_{opt}$ for the minimum cross-talk.

Figure 10:
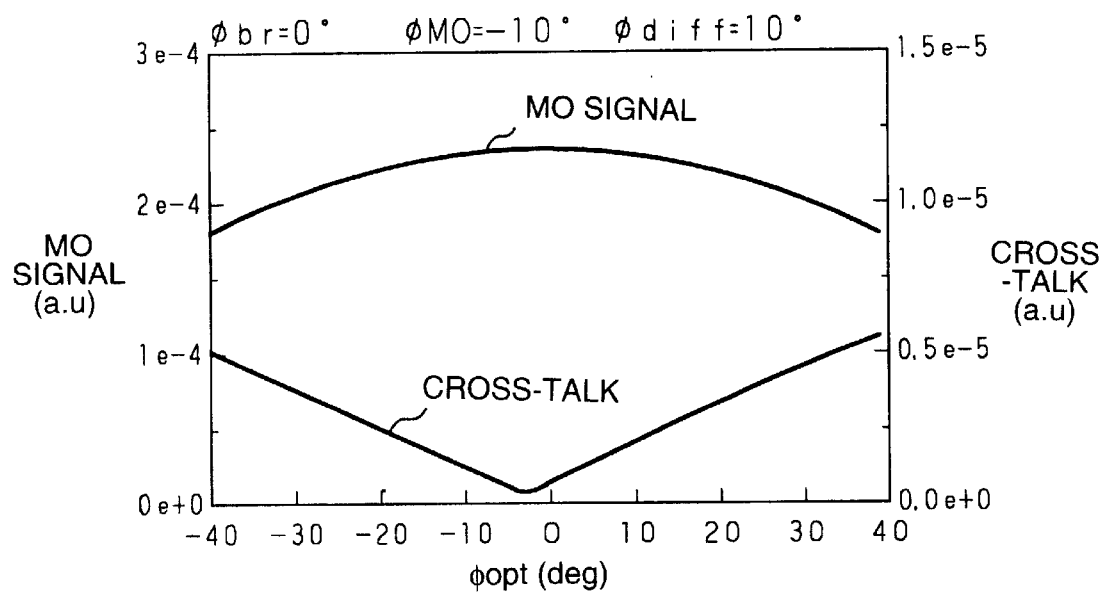
FIG. 10 graphically illustrates a relation between $\phi_{opt}$ and MO signal and a relation between $\phi_{opt}$ and cross-talk, when $\phi_{br}$=0°, $\phi_{MO}$=-10° and $\phi_{diff}$=10°.

FIG. 10 shows a relation between $\phi_{opt}$ and MO signal and a relation between $\phi_{opt}$ and cross-talk, when $\phi_{br}0°$, $\phi_{MO}=-10°$ and $\phi_{diff}=+10°$. The amplitude of the MO signal is at the maximum when $\phi_{opt}=0°$ because $\phi_{total}=0°$ when $\phi_{br}+\phi_{MO}+\phi_{diff}=0°$ and $\phi_{opt}=0°$. At this time, the cross-talk is at the minimum when $\phi_{opt}$ is approximately 0°.

As seen from FIGS. 7 and 10, the phase difference $\phi_{diff}$ affects the value $\phi_{opt}$ for the maximum MO signal amplitude, but not the value $\phi_{opt}$ for the minimum cross-talk.

As proved from the results shown above, the value $\phi_{opt}$ for the minimum cross-talk is not influenced by the values $\phi_{MO}$ and $\phi_{diff}$, but only by the value $\phi_{br}$.

Figure 11:
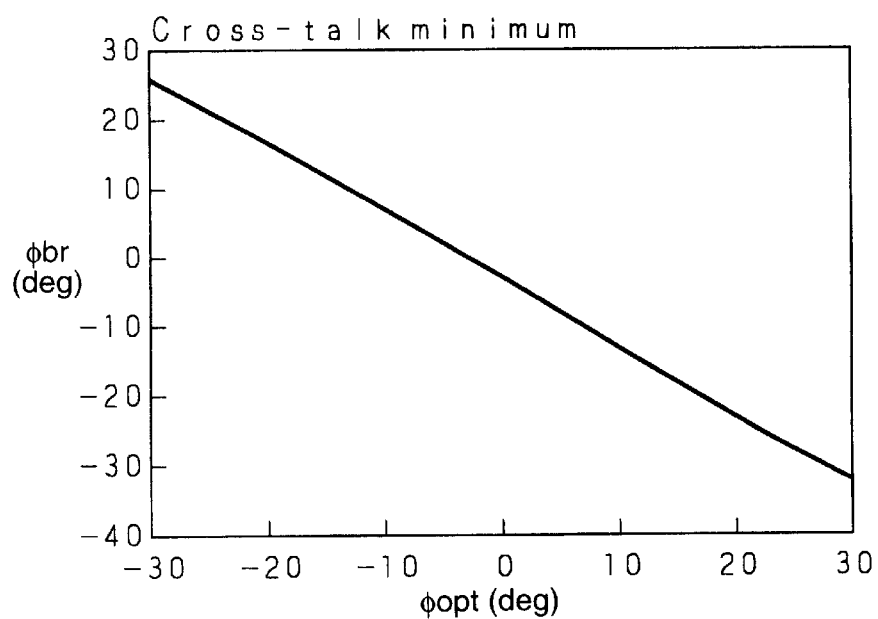
FIG. 11 graphically illustrates a relation between $\phi_{opt}$ and $\phi_{br}$ when the cross-talk is minimum.

Experiments were conducted to find a relation between $\phi_{opt}$ and $\phi_{br}$ when the cross-talk is at the minimum. FIG. 11 shows the result of the experiments. As seen, when the value $\phi_{br}$ is set to be within a range of about −20° to +10°, the value $\phi_{opt}$ for the minimum cross-talk can be suppressed to less than ±15°. That is, when the value $\phi_{br}$ is set to be within a range of about −20° to +10°, the cross-talk can be suppressed while the condition: $\phi_{opt}<\pm15°$.

Figure 12:
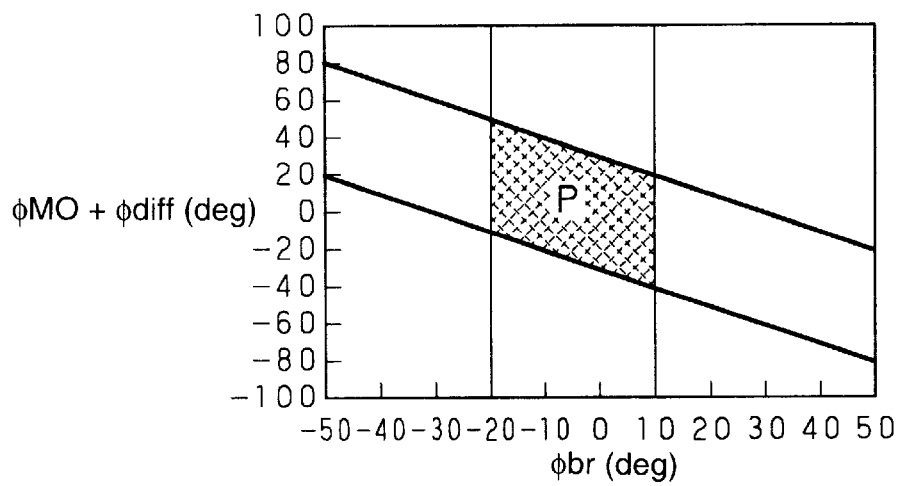
FIG. 12 graphically illustrates a range of $\phi_{br}$ and $\phi_{MO}+\phi_{diff}$ in which the magneto-optical disc has to fall.

FIG. 12 shows a range of $\phi_{br}$ and $\phi_{MO}+\phi_{diff}$ in which the phase differences of the magneto-optical disc should fall. As mentioned above, a sum of $_{br}+\phi_{MO}+\phi_{diff}$ has to be within a range of ±30° in order to suppress the deterioration in amplitude of the MO signal due to the phase differences to 3 dB or so. For suppression of the cross-talk, the value $\phi_{br}$ should preferably be $-20°<\phi_{br}<+10°$. Therefore, by setting the range of $\phi_{br}$ and $\phi_{MO}+\phi_{diff}$ for inclusion in a range P shown in FIG. 12, the deterioration in amplitude of the MO signal due to the phase differences can be suppressed to less than 3 dB and the cross-talk can also be suppressed, when the phase difference $\phi_{opt}$ is within ±15°.

Generally, the magneto-optical disc has spiral or concentrical grooves formed thereon to obtain a servo signal. The magneto-optical discs having grooves formed thereon include a one formatted to record MO signal in the groove, a one formatted to record MO signal on the land between the grooves, and a one formatted to MO signal at both the groove and on the land.

As the magneto-optical disc formatted for on-land recording, a magneto-optical disc conforming to ISO/IEC 15041 (640 Mbyte, 90 mm MO) is well known, for example. Also, as an example of the magneto-optical disc formatted for in-groove recording, a magneto-optical disc conforming to ISO/IEC 15286 (5.2 Gbyte, 130 mm MO) is known.

Figure 13:
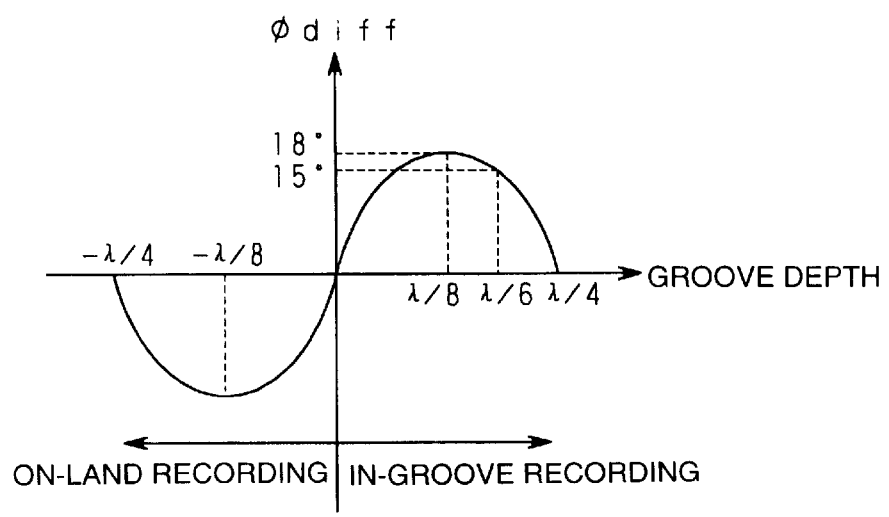
FIG. 13 graphically illustrates a relation between groove depth and $\phi_{diff}$.

The phase difference $\phi_{diff}$ is caused by the light diffraction at the groove and land, and its magnitude greatly depends upon the groove depth. FIG. 13 shows a relation between the groove depth and $\phi_{diff}$, as calculated by a computer, when a signal is recorded in an area of 0.85 μm in track pitch and 0.7 in duty ratio. In FIG. 13, the horizontal axis indicates the groove depth, that is, a distance from the reference surface to recording surface. Therefore, the positive region of the horizontal axis corresponds to the in-groove recording format, while the negative region corresponds to the on-land recording format. As seen from FIG. 13, the sign of $\phi_{diff}$ is opposite in the positive region to that in the negative region.

Generally, for a good servo signal, the groove depth should be on the order of $\lambda/6\pm\lambda/24$ in all the in-groove recording-formatted magneto-optical disc, on-land/in-groove recording-formatted magneto-optical disc and on-land recording-formatted magneto-optical disc. The value λ is a wavelength, in the disc substrate, of the read light used to reproduce a signal recorded at the recording layer of the magneto-optical disc. Taking the wavelength λ of the light in vacuum as $\lambda_0$ and the refractive index of the disc substrate as n, the value λ can be expressed as=$\lambda_0$/n.

When the groove depth is on the order of $\lambda/6 \pm \lambda/24$, the value $\phi_{diff}$ is about +15° in the in-groove recording-formatted magneto-optical disc and about −15° in the on-land recording-formatted magneto-optical disc, as shown in FIG. 13.

Since the value $\phi_{diff}$ depends upon the recording format of a magneto-optical disc, the requirement that the total of phase differences ($\phi_{br}+\phi_{MO}+\phi_{diff}$) caused by the magneto-optical disc should be suppressed to within a range of ±30° can be met by rewriting the total ($\phi_{br}+\phi_{MO}+\phi_{diff}$) to a one not including $\phi_{diff}$ for each recording format.

That is to say, since the phase difference $\phi_{diff}$ is about +15° for the in-groove recording-formatted magneto-optical disc, so the total ($\phi_{br}+\phi_{MO}$) should be −45°<($\phi_{br}+\phi_{MO}$)<+15°. A range in which the values $\phi_{br}$ and $\phi_{MO}$ should fall for the magneto-optical disc formatted for in-groove recording is as shown in FIG. 14.

Figure 14:
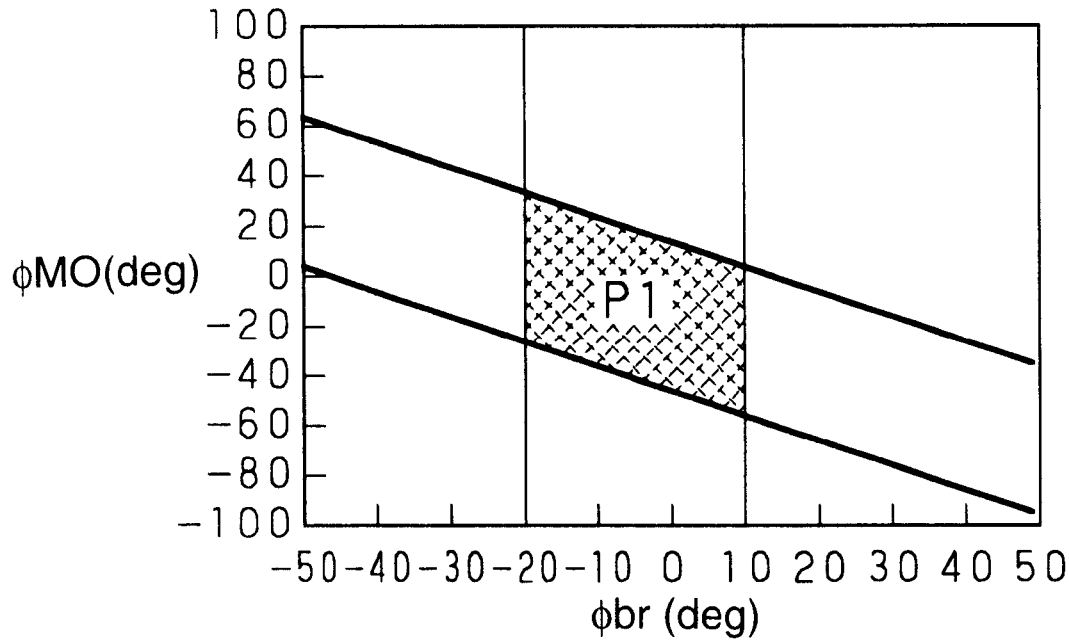
FIG. 14 graphically illustrates a range of $\phi_{br}$ and $\phi_{MO}$ for a magneto-optical disc formatted for in-groove recording.

Namely, by setting the range of $\phi_{br}$ and $\phi_{MO}$ for inclusion in a range P1 shown in FIG. 14 for the in-groove recording-formatted magneto-optical disc, the deterioration in amplitude of the MO signal due to the phase differences can be suppressed to less than 3 dB and the cross-talk can also be suppressed, when the phase difference $\phi_{opt}$ is within ±15°.

Also, since the phase difference $\phi_{diff}$ is about −15° for the on-land recording-formatted magneto-optical disc, so the total ($\phi_{br}+\phi_{MO}$) should be −15°<($\phi_{br}+\phi_{MO}$)<+45°. A range in which the values $\phi_{br}$ and $\phi_{MO}$ should fall for the magneto-optical disc formatted for on-land recording is as shown in FIG. 15.

Figure 15:
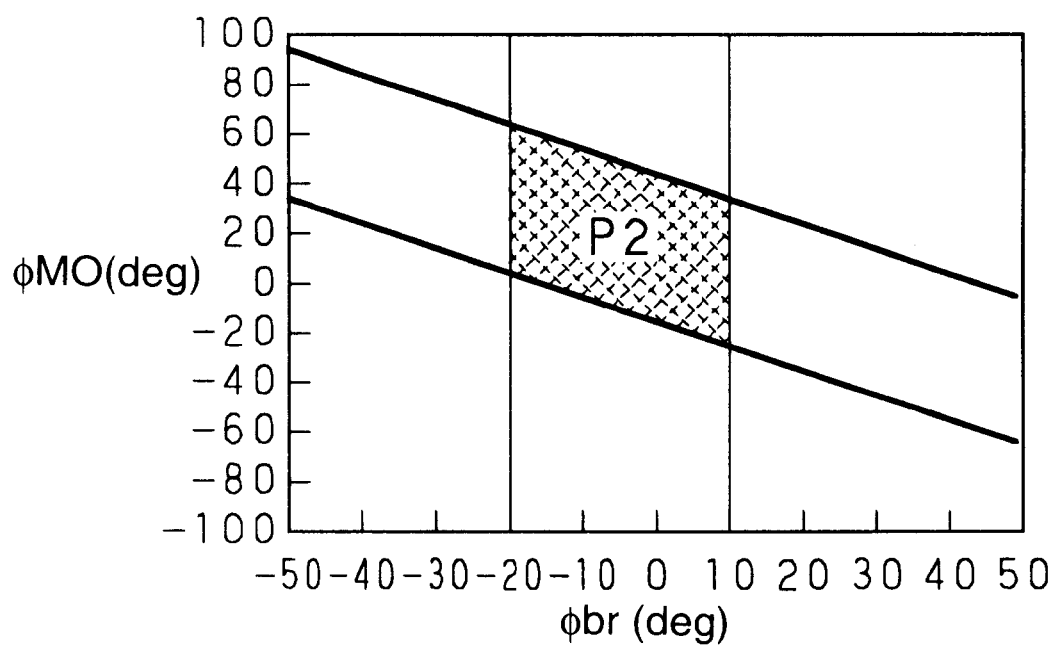
FIG. 15 graphically illustrates a range of $\phi_{br}$ and if $\phi_{MO}$ for a magneto-optical disc formatted for on-land recording.

Namely, by setting the range of $\phi_{br}$ and $\phi_{MO}$ for inclusion in a range P2 shown in FIG. 15 for the on-land recording-formatted magneto-optical disc, the deterioration in amplitude of the MO signal due to the phase differences can be suppressed to less than 3 dB and the cross-talk can also be suppressed, when the phase difference $\phi_{opt}$ is within ±15°.

Since in the on-land/in-groove recording-formatted magneto-optical disc, the characteristics of the land and groove should be met respectively, so the total ($\phi_{br}+\phi_{MO}$) should be −15°<($\phi_{br}+\phi_{MO}$)<+15°. A range in which the values $\phi_{br}$ and $\phi_{MO}$ should fall for the magneto-optical disc formatted for on-land/in-groove recording is as shown in FIG. 16.

Figure 16:
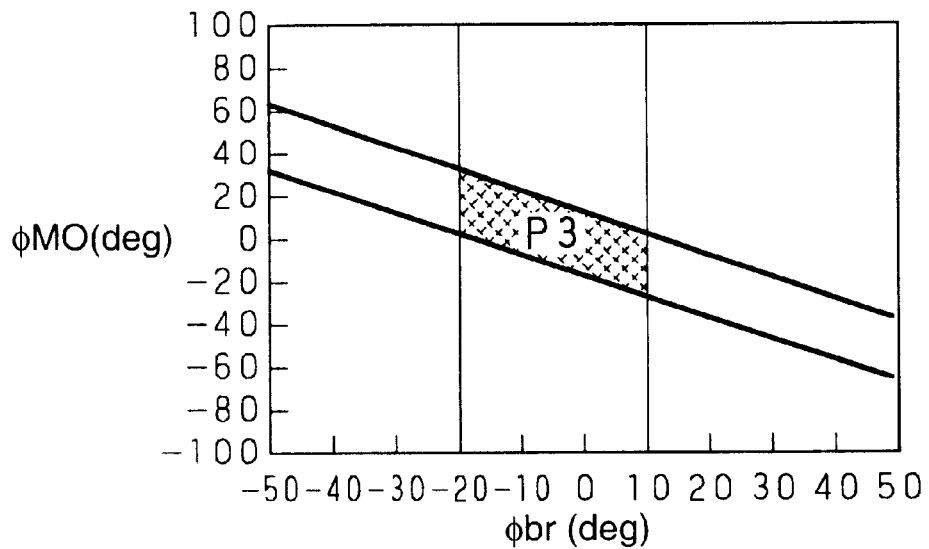
FIG. 16 graphically illustrates a range of $\phi_{br}$ and $\phi_{MO}$ for a magneto-optical disc formatted for on-land/in-groove recording.

Namely, by setting the range of $\phi_{br}$ and $\phi_{MO}$ for inclusion in a range P3 shown in FIG. 16 for the on-land/in-groove recording-formatted magneto-optical disc, the deterioration in amplitude of the MO signal due to the phase differences can be suppressed to less than 3 dB and the cross-talk can also be suppressed, when the phase difference $\phi_{opt}$ is within ±15°.

Next, the embodiments of magneto-optical disc according to the present invention will be described. It should be noted that in the following description, the first embodiment is an on-land recording-formatted magneto-optical disc while the second embodiment is an in-groove recording-formatted magneto-optical disc.

Figure 17:
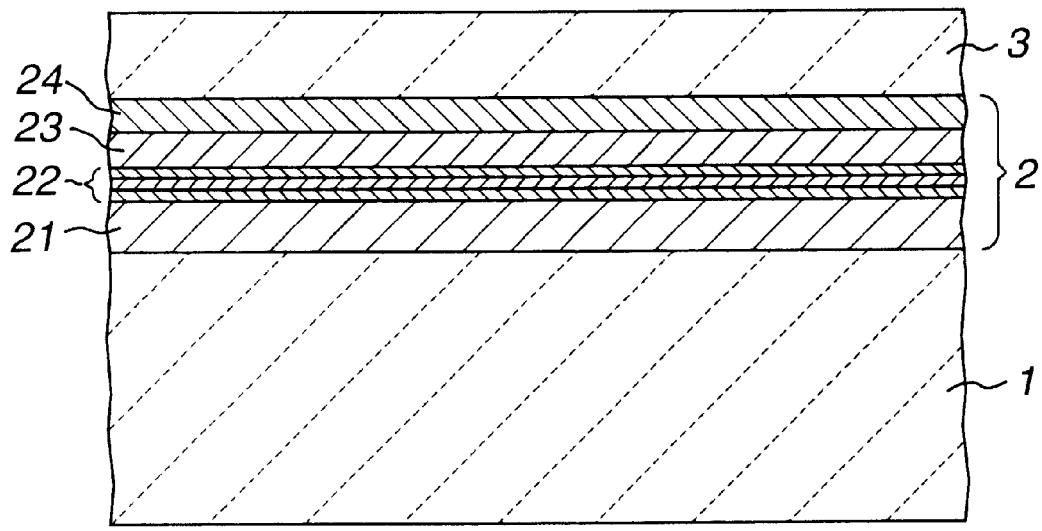
FIG. 17 is a sectional view, enlarged in scale, of the essential portion of a first embodiment of magneto-optical disc according to the present invention.

FIG. 17 shows the first embodiment which is a ZCAV-formatted magneto-optical disc adopting an on-land recording format of 0.9 μm in track pitch and λ/5 in groove depth.

As shown in FIG. 17, the first embodiment of magneto-optical disc comprises a substrate 1, recording layer 2 formed on the substrate, and a protective layer 3 formed on the recording layer 2. The recording layer 2 further includes a first dielectric sub-layer 21 made of SiN, magneto-optical recording sub-layer 22 made of a magnetic material for magneto-optical recording, a second dielectric sub-layer 23 made of SiN, and a reflective sub-layer 24 made of Al.

The magneto-optical recording layer 22 further consists of three sub-layers of GdFeCo, GdFeCoSi and TbFeCo, respectively, for reproduction with the MSR (magnetically induced super-resolution) technology.

The MSR technology uses the magnetic switched coupling between multiple sub-layers to assure a higher resolution than determined by the wavelength of a read light used. The MSR technology includes for example the FAD (front aperture detection) method in which magnetization in a high temperature area within a beam spot is oriented in one direction to detect signal from only a low temperature area, RAD (rear aperture detection) method in which magnetization in a low temperature area within a beam spot is oriented in one direction to detect signal from only a high temperature area, etc. In all these methods, the area from which signal is read by a read beam spot is narrow, which results in the same effect as will be obtained by reducing the size of the read beam spot.

The first magneto-optical disc constructed as having been described is adapted such that the phase difference $\phi_{br}$ caused by the birefringence at the substrate 1 is −4° and the phase difference $\phi_{MO}$ caused by the magneto-optic Kerr effect of the recording layer 2 is −8°.

The value of $\phi_{br}$ is controlled by adjusting the resin temperature during molding of the disc substrate and the value of $\phi_{MO}$ is controlled by changing the thickness of each of the sub-layers forming together the recording layer 2. Note that the value of $\phi_{br}$ can be controlled by adjusting the molding conditions including resin temperature, etc. during molding of the disc substrate 1, as well as by using any other material for the disc substrate 1, for example. Also the value of $\phi_{MO}$ can not only be controlled by checking the thickness of each of the sub-layers forming together the recording layer 2 but also by changing the construction of the recording layer 2 and material for each of the sub-layers, for example.

A mark/space signal of 0.76 μm in period was repeatedly written to the first magneto-optical disc, and thereafter an optical system capable of freely changing the magnitude of $\phi_{opt}$ was used to read the recorded mark/space signal from the magneto-optical disc. In the optical system used to read the signal, the wavelength $\lambda_0$ of the read light was 680 nm and the numerical aperture NA of the objective lens to focus the read light was 0.55.

Figure 18:
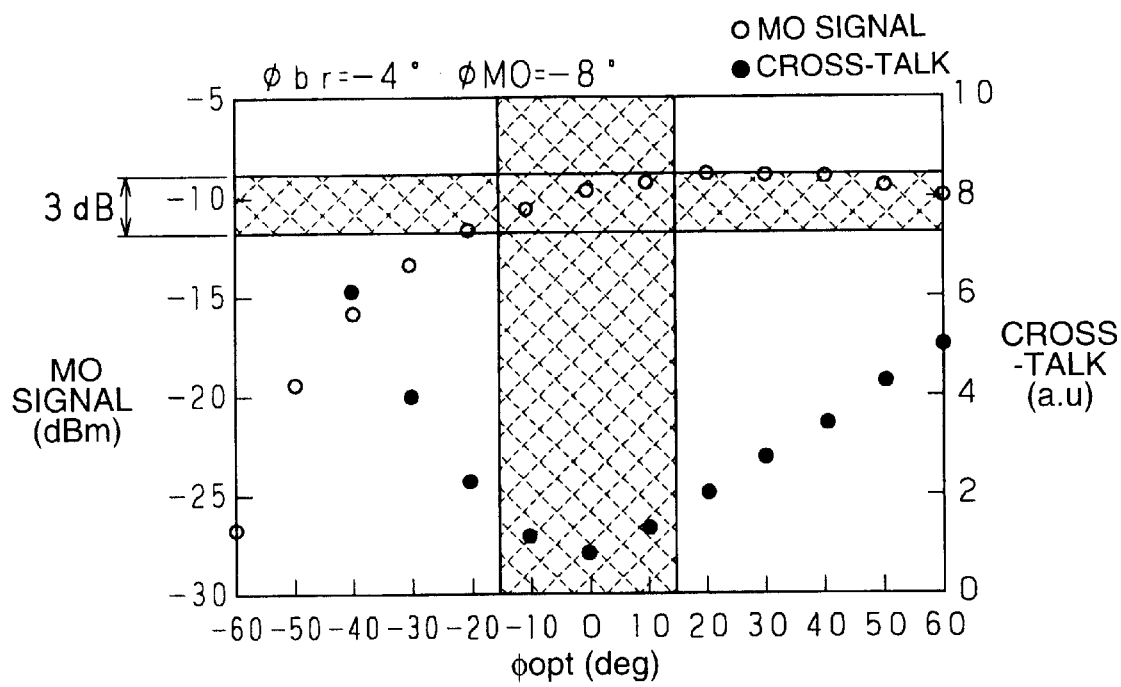
FIG. 18 graphically illustrates a relation between a phase difference $\phi_{opt}$ and MO signal and a relation between $\phi_{opt}$ and cross-talk in the first embodiment of magneto-optical disc of the present invention.

By writing and reading a signal to/from the first magneto-optical disc as in the above, the dependence of the MO signal on $\phi_{opt}$ and that of the cross-talk at the band boundary on $\phi_{opt}$ were measured. The results are shown in FIG. 18. As seen, in the first magneto-optical disc, the deterioration of MO signal due to the phase difference is suppressed to less than 3 dB and the cross-talk is generally at the minimum, when the phase difference $\phi_{opt}$ is within a range of ±15°.

Figure 19:
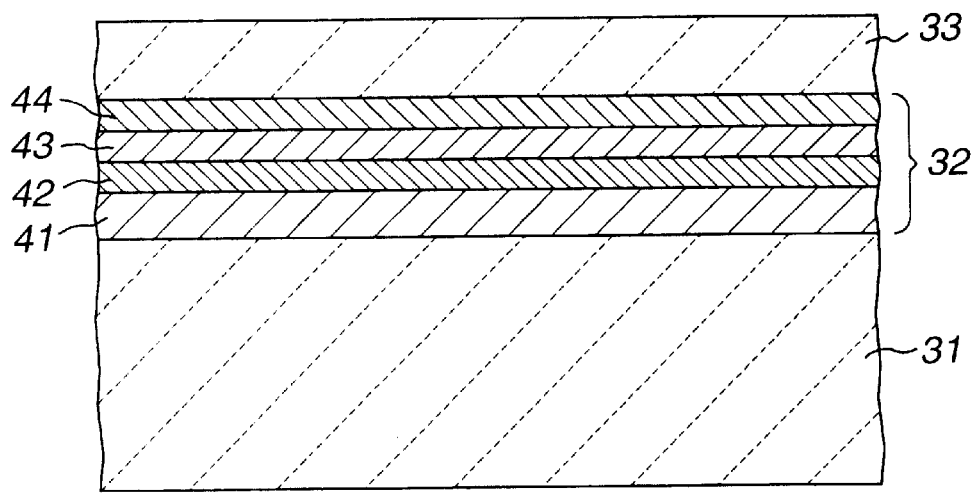
FIG. 19 is a sectional view, enlarged in scale, of the essential portion of a second embodiment of magneto-optical disc according to the present invention.

Next, the second magneto-optical disc will be described. FIG. 19 is a sectional view, enlarged in scale, of the essential portion of the second embodiment of magneto-optical disc according to the present invention.

Similarly to the first magnet-optical disc, the second magneto-optical disc is also a ZCAV-formatted one. In the second magneto-optical disc, however, the in-groove recording format of 0.85 μm in tack pitch is adopted. Note that the groove depth is set to λ/5 as in the first magneto-optical disc.

As shown in FIG. 19, the second magneto-optical disc comprises a substrate 31, recording layer 32 formed on the substrate, and a protective layer 33 formed on the recording layer 32. The recording layer 32 further includes a first dielectric sub-layer 41 made of SiN, magneto-optical recording sub-layer 42 made of TbFeCo a magnetic material for magneto-optical recording, a second dielectric sub-layer 43 made of SiN, and a reflective sub-layer 44 made of Al.

The second magneto-optical disc constructed as having been described is adapted such that the phase difference $\phi_{br}$ caused by the birefringence at the substrate 31 is −4° and the phase difference $\phi_{MO}$ caused by the magneto-optic Kerr effect of the recording layer 32 is −8°.

The value of $\phi_{br}$ is controlled by adjusting the resin temperature during molding of the disc substrate and the value of $\phi_{MO}$ is controlled by changing the thickness of each of the sub-layers forming together the recording layer 32. Note that the value of $\phi_{br}$ can be controlled by adjusting the molding conditions including resin temperature, etc. during molding of the disc substrate 31, as well as by using any other material for the disc substrate 31, for example. Also the value of $\phi_{MO}$ can not only be controlled by checking the thickness of each of the sub-layers forming together the recording layer 32 but also by changing the construction of the recording layer 32 and material for each of the sub-layers, for example.

A mark/space signal of 1.07 μm in period was repeatedly written to the second magneto-optical disc, and thereafter an optical system capable of freely changing the magnitude of $\phi_{opt}$ was used to read the recorded mark/space signal from the magneto-optical disc. In the optical system used to read the signal, the wavelength $\lambda_0$ of the read light was 680 mn and the numerical aperture NA of the objective lens to focus the read light was 0.55.

Figure 20:
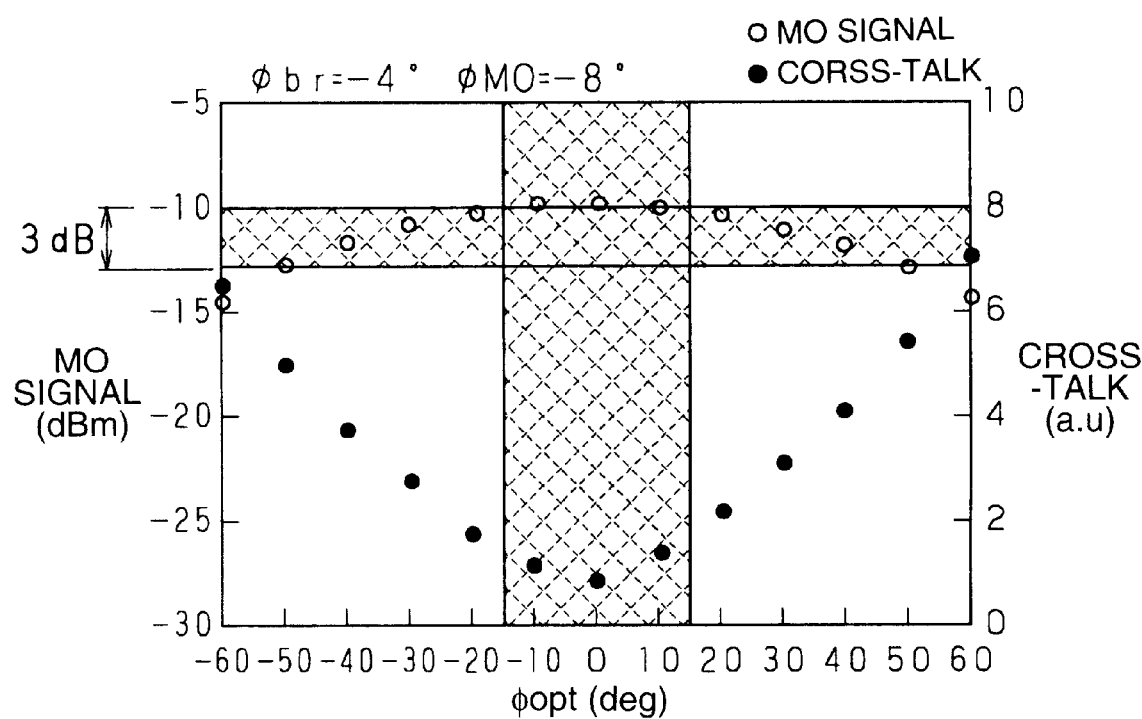
FIG. 20 graphically illustrates a relation between a phase difference $\phi_{opt}$ and MO signal and a relation between $\phi_{opt}$ and cross-talk in the second embodiment of magneto-optical disc of the present invention.

By writing and reading a signal to/from the first magneto-optical disc as in the above, the dependence of the MO signal on $\phi_{opt}$ and that of the cross-talk at the band boundary on $\phi_{opt}$ were measured. The results are shown in FIG. 20 showing a relation between a phase difference $\phi_{opt}$ and MO signal and a relation between $\phi_{opt}$ and cross-talk in the second embodiment of magneto-optical disc of the present invention. It will be seen FIG. 20 that also in the second magneto-optical disc, the deterioration of MO signal due to the phase difference is suppressed to less than 3 dB and the cross-talk is generally at the minimum, when the phase difference $\phi_{opt}$ is within a range of ±15°.

As obvious from the foregoing description, even if the adoption of the ZCAV format results in an adjacency of an embossed pit area in where there are pre-formed embossed pits of which the convex-concave pattern indicates information and a magneto-optical recording area where no embossed pits are formed, the present invention can suppress the cross-talk caused by a local change of the optical characteristic and can provide a sufficiently high output of reproduction.

It should be noted that the present invention can be applied to any magneto-optical disc in which an embossed pit area in where there are pre-formed embossed pits of which the convex-concave pattern indicates information and a magneto-optical recording area where no embossed pits are formed, are adjacent to each other, and that it is not limited only to a ZCAV-formatted magneto-optical disc.

That is, the present invention is effectively applicable to a magneto-optical disc having a read-only area in where there are pre-formed embossed pits of which the convex-concave pattern indicates information and a rewritable area to which information can be written by magneto-optical recording, such as so-called partial ROM.

The present invention can effectively suppress a cross-talk caused by a local change of the optical characteristic and which is likely to take place especially if the track pitch is narrow, more particularly, if it is 1.0 μm or less.

As apparent from the foregoing description, the present invention provides a magneto-optical disc incurring less cross-talk caused by a local change of the optical characteristic and capable of providing a sufficiently high output of reproduction even if an embossed pit area in where there are pre-formed embossed pits of which the convex-concave pattern indicates information and a magneto-optical recording area where no embossed pits are formed, are adjacent to each other in the magneto-optical disc.

What is claimed is:

1. A magneto-optical recording medium comprising a substrate having grooves and lands formed along recording tracks and also formed thereon embossed pits indicating information by their convex-concave pattern and which is formatted to record a magneto-optical signal in the groove, wherein on the assumption that a direction in the plane of a recording layer and perpendicular to the recording track is an x-direction while a direction in the plane of the recording layer and along the recording track is a y-direction and that of phase differences between an x-directional polarized component and a y-directional polarized component of a return part of a reading light reflected back from the recording layer, a one caused by a birefringence at the substrate is $\phi_{br}$ while a one caused by the magneto-optic Kerr effect of the recording layer is $\phi_{MO}$, the magneto-optical recording medium meets the following conditions (1) and (2):

$$-20°<\phi_{br}<+10° \qquad (1)$$

$$-45°<(\phi_{br}+\phi_{MO})<+15°. \qquad (2)$$

2. The magneto-optical recording medium as set forth in claim 1, wherein on the assumption that of phase differences between an x-directional polarized component and a y-directional polarized component of a return part of a reading light reflected back from the recording layer, a one caused by a diffraction at the groove and land is $\phi_{diff}$, the magneto-optical recording medium meets the following condition (3):

$$-30°<(\phi_{br}+\phi_{MO}+\phi_{diff})<+30° \qquad (3)$$

3. A magneto-optical recording medium comprising a substrate having grooves and lands formed along recording tracks and also formed thereon embossed pits indicating information by their convex-concave pattern and which is formatted to record a magneto-optical signal on the land, wherein on the assumption that a direction in the plane of a recording layer and perpendicular to the recording track is an x-direction while a direction in the plane of the recording layer and along the recording track is a y-direction and that of phase differences between an x-directional polarized component and a y-directional polarized component of a return part of a reading light reflected back from the recording layer, a one caused by a birefringence at the substrate is $\phi_{br}$ while a one caused by the magneto-optic Kerr effect of the recording layer is $\phi_{MO}$, the magneto-optical recording medium meets the following conditions (1) and (4):

$$-20°<\phi_{br}<+10° \qquad (1)$$

$$-15°<(\phi_{br}+\phi_{MO})<+45°. \qquad (4)$$

4. The magneto-optical recording medium as set forth in claim 3, wherein on the assumption that of phase differences between an x-directional polarized component and a y-directional polarized component of a return part of a reading light reflected back from the recording layer, a one caused by a diffraction at the groove and land is $\phi_{diff}$ the magneto-optical recording medium meets the following condition (3):

$$-30°<(\phi_{br}+\phi_{MO}+\phi_{diff})<+30° \qquad (3)$$

5. A magneto-optical recording medium comprising a substrate having grooves and lands formed along recording tracks and also formed thereon embossed pits indicating information by their convex-concave pattern and which is formatted to record a magneto-optical signal on both the land and groove, wherein on the assumption that a direction in the plane of a recording layer and perpendicular to the recording track is an x-direction while a direction in the plane of the recording layer and along the recording track is a y-direction and that of phase differences between an x-directional polarized component and a y-directional polarized component of a return part of a reading light reflected back from the recording layer, a one caused by a birefringence at the substrate is $\phi_{br}$, while a one caused by the magneto-optic Kerr effect of the recording layer is $\phi_{MO}$, the magneto-optical recording medium meets the following conditions (1) and (5):

$$-20°<\phi_{br}<+10° \qquad (1)$$

$$-15°<(\phi_{br}+\phi_{MO})<+15°. \qquad (5)$$

6. The magneto-optical recording medium as set forth in claim 5, wherein on the assumption that of phase differences between an x-directional polarized component and a y-directional polarized component of a return part of a reading light reflected back from the recording layer, a one caused by a diffraction at the groove and land is $\phi_{diff}$, the magneto-optical recording medium meets the following condition (3):

$$-30°<(\phi_{br}+\phi_{MO}+\phi_{diff})<+30°. \qquad (3)$$

* * * * *

UNITED STATES PATENT AND TRADEMARK OFFICE
CERTIFICATE OF CORRECTION

PATENT NO. : 6,208,595 B1
DATED : March 27, 2001
INVENTOR(S) : Fukushima et al.

Page 1 of 1

It is certified that error appears in the above-identified patent and that said Letters Patent is hereby corrected as shown below:

<u>Title page,</u>
Item [73], the Assignee information is incorrect. Item [73] should read:
-- [73]   Assignees: Sony Corporation, Tokyo;
                          Fujitsu Limited, Kawasaki, both of (JP) --

Signed and Sealed this

Seventh Day of May, 2002

*Attest:*

JAMES E. ROGAN
*Attesting Officer*     *Director of the United States Patent and Trademark Office*